US012792599B2

(12) United States Patent
Park et al.

(10) Patent No.: US 12,792,599 B2
(45) Date of Patent: Nov. 10, 2026

(54) METHOD AND SYSTEM FOR FACT DETERMINATION

(71) Applicant: SAMSUNG SDS CO., LTD., Seoul (KR)

(72) Inventors: Min Sue Park, Seoul (KR); Seung Hyun Shin, Seoul (KR); Jung Kyum Yu, Seoul (KR); Joon Goo Lee, Seoul (KR); Sung Woo Cho, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 0 days.

(21) Appl. No.: 19/229,496

(22) Filed: Jun. 5, 2025

(65) Prior Publication Data

US 2026/0072903 A1 Mar. 12, 2026

(30) Foreign Application Priority Data

Sep. 10, 2024 (KR) ........................ 10-2024-0123277
Oct. 30, 2024 (KR) ........................ 10-2024-0150498

(51) Int. Cl.
*G06F 16/20* (2019.01)
*G06F 16/242* (2019.01)

(52) U.S. Cl.
CPC .................................. *G06F 16/243* (2019.01)

(58) Field of Classification Search
CPC ..................................................... G06F 16/243
See application file for complete search history.

(56) References Cited

U.S. PATENT DOCUMENTS

| | | | | |
|---|---|---|---|---|
| 11,875,130 | B1 | 1/2024 | Bosnjakovic et al. | |
| 12,067,366 | B1 | 8/2024 | Heller et al. | |
| 2021/0081503 | A1 * | 3/2021 | Tran | G06N 3/08 |
| 2023/0119109 | A1 | 4/2023 | Choubey et al. | |
| 2024/0296177 | A1 | 9/2024 | Gardner et al. | |
| 2025/0077940 | A1 * | 3/2025 | Cui | G06N 20/00 |

FOREIGN PATENT DOCUMENTS

| | | | | |
|---|---|---|---|---|
| KR | 10-2023-0121654 A | | 8/2023 | |
| KR | 10-2694892 B1 | | 8/2024 | |
| WO | WO-2023075890 A1 | * | 5/2023 | G06F 40/30 |

OTHER PUBLICATIONS

Zhang et al., "Enhancing Hallucination Detection through Perturbation-Based Synthetic Data Generation in System Responses", arXiv:2407.05474v1 [cs.AI] Jul. 7, 2024, 2024, (12 pages total).

* cited by examiner

*Primary Examiner* — Kristopher Andersen
(74) *Attorney, Agent, or Firm* — Sughrue Mion, PLLC

(57) ABSTRACT

A fact determination method is provided, the method comprising receiving target text, generating one or more question prompts using a prompt generation model to induce extraction of information associated with the target text, obtaining answers to the respective question prompts by inputting the question prompts into a language model and outputting a result of determining whether the target text is factual using the language model.

18 Claims, 14 Drawing Sheets

METHOD AND SYSTEM FOR FACT DETERMINATION

CROSS-REFERENCE TO RELATED APPLICATIONS

This application claims priority from Korean Patent Application No. 10-2024-0123277 filed on Sep. 10, 2024, and Korean Patent Application No. 10-2024-0150498 filed on Oct. 30, 2024, in the Korean Intellectual Property Office, and all the benefits accruing therefrom under 35 U.S. C. 119, the contents of which in its entirety are herein incorporated by reference.

BACKGROUND

1. Field

The present disclosure relates to a fact determination method and system, and more particularly, to a method and system capable of improving the accuracy of fact determination by using prompts optimized for a language model.

2. Description of the Related Art

Recently, large language models (LLMs) have been utilized in various fields, and their performance has also been advancing at a remarkable pace. However, despite such technological progress, the phenomenon of hallucination, where non-existent or untrue information is generated as if it were factual, still remains a significant challenge.

Various methods have been proposed to address such hallucination, but each of the conventional approaches has its limitations. For example, methods such as Retrieval-Augmented Generation (RAG), which utilize external information, are known, but these methods are inefficient in that they require a large amount of external data for fact determination. Additionally, methods that identify hallucination-prone outputs by measuring the uncertainty of answers generated by language models are also known, but are difficult to apply to black-box models in which access to internal model information is unavailable.

Therefore, there is still a need for research on methods capable of overcoming the limitations of conventional hallucination detection methods, i.e., methods for determining the factuality of information, while also providing accurate fact determination results.

SUMMARY

An objective of the present disclosure is to provide a method and system for improving the accuracy of fact determination using a language model by applying a prompt generation model.

Another objective of the present disclosure is to provide a method and system for improving the accuracy of fact determination using a specific language model by training a prompt generation model to generate prompts optimized for the specific language model.

The objectives of the present disclosure are not limited to those mentioned above, and other objectives not explicitly stated will be clearly understood by those skilled in the art based on the following description.

According to an aspect of the present disclosure, there is provided a fact determination method performed by at least one computing device. The method may comprise receiving target text, generating one or more question prompts using a prompt generation model to induce extraction of information associated with the target text, obtaining answers to the respective question prompts by inputting the question prompts into a language model and outputting a result of determining whether the target text is factual using the language model.

In some embodiments, the prompt generation model may be a model trained to generate question prompts optimized for the language model, and the training of the prompt generation model may comprise obtaining a plurality of first training data pairs, each of the first training data pairs including text, a plurality of questions associated with the text, and correct answers to the respective questions; filtering out some of the first training data pairs; and primarily training the prompt generation model using remaining first training data pairs that have not been filtered out.

In some embodiments, the filtering out of some of the first training data pairs may comprise obtaining answers to the respective questions, comparing the correct answers with the obtained answers, and removing training data pairs in which the correct answers and the answers do not match from among the first training data pairs.

In some embodiments, the training of the prompt generation model may further comprise obtaining a plurality of second training data pairs using the primarily trained prompt generation model and the language model, filtering out some of the plurality of second training data pairs, and further training the prompt generation model using remaining second training data pairs that have not been filtered out.

In some embodiments, the obtaining of the plurality of second training data pairs may comprise generating one or more question prompts for each of a plurality of first training texts using the primarily trained prompt generation model, and obtaining answers to the respective question prompts by inputting the plurality of first training texts and corresponding question prompts into the language model.

In some embodiments, the filtering out of some of the plurality of second training data pairs may comprise sending a fact determination request for the plurality of second training data pairs to the language model, and removing training data pairs determined to be nonfactual in response to the fact determination request from among the plurality of second training data pairs.

In some embodiments, the outputting of the result of determining whether the target text is factual may comprise generating a fact determination prompt for determining whether the target text is factual using the prompt generation model, and generating the result of determining whether the target text is factual by inputting the fact determination prompt into the language model.

In some embodiments, the prompt generation model may be a model trained to generate fact determination prompts optimized for the language model, and the training of the prompt generation model may comprise sending a fact determination prompt generation request for a plurality of second training texts to the language model to generate a plurality of text-prompt pair data, filtering out some of the plurality of text-prompt pair data, and training the prompt generation model using remaining text-prompt pair data that have not been filtered out.

In some embodiments, the generating of the plurality of text-prompt pair data may comprise obtaining a plurality of training documents, and generating the plurality of second training texts by dividing each of the plurality of training documents into sentence units.

In some embodiments, the filtering out of some of the plurality of text-prompt pair data may comprise sending a fact determination request for the plurality of text-prompt pair data to the language model, and removing text-prompt pair data determined to be nonfactual in response to the fact determination request from among the plurality of text-prompt pair data.

According to an aspect of the present disclosure, there is provided a computing device comprising: at least one processor and at least one memory storing instructions which, when executed by the at least one processor, cause the at least one processor to perform operations, wherein the operations may comprise receiving target text, generating one or more question prompts using a prompt generation model to induce extraction of information associated with the target text, obtaining answers to the respective question prompts by inputting the question prompts into a language model and outputting a result of determining whether the target text is factual using the language model.

In some embodiments the prompt generation model may be a model trained to generate question prompts optimized for the language model, the operations may further comprise training the prompt generation model, and the training of the prompt generation model may comprise obtaining a plurality of first training data pairs, each of the first training data pairs including text, a plurality of questions associated with the text, and correct answers to the respective questions, filtering out some of the first training data pairs, and primarily training the prompt generation model using remaining first training data pairs that have not been filtered out.

In some embodiments, the filtering out of some of the first training data pairs may comprise obtaining answers to the respective questions by inputting the text and the plurality of questions associated with the text into the language model, comparing the correct answers with the obtained answers, and removing training data pairs in which the correct answers and the answers do not match from among the first training data pairs.

In some embodiments, the training of the prompt generation model may further comprise obtaining a plurality of second training data pairs using the primarily trained prompt generation model and the language model, filtering out some of the plurality of second training data pairs, and further training the prompt generation model using remaining second training data pairs that have not been filtered out.

In some embodiments, the obtaining of the second training data pairs may comprise generating one or more question prompts for each of a plurality of first training texts using the primarily trained prompt generation model, and obtaining answers to the respective question prompts by inputting the plurality of first training texts and corresponding question prompts into the language model.

In some embodiments, the filtering out of some of the second training data pairs may comprise sending a fact determination request for the second training data pairs to the language model, and removing training data pairs determined to be nonfactual in response to the fact determination request from among the second training data pairs.

In some embodiments, the outputting of the result of determining whether the target text is factual may comprise generating a fact determination prompt for determining whether the target text is factual using the prompt generation model, and generating the result of determining whether the target text is factual by inputting the fact determination prompt into the language model.

In some embodiments, the prompt generation model may be a model trained to generate fact determination prompts optimized for the language model, the operations may further comprise training the prompt generation model, and the training of the prompt generation model may comprise sending a fact determination prompt generation request for a plurality of second training texts to the language model to generate a plurality of text-prompt pair data, filtering out some of the plurality of text-prompt pair data, and training the prompt generation model using remaining text-prompt pair data that have not been filtered out.

In some embodiments, the generating of the plurality of text-prompt pair data may comprise obtaining a plurality of training documents, and generating the plurality of second training texts by dividing each of the plurality of training documents into sentence units.

In some embodiments, the filtering out of some of the plurality of text-prompt pair data may comprise sending a fact determination request for the plurality of text-prompt pair data to the language model, and removing text-prompt pair data determined to be nonfactual in response to the fact determination request from among the plurality of text-prompt pair data.

It should be noted that the effects of the present disclosure are not limited to those described above, and other effects of the present disclosure will be apparent from the following description.

BRIEF DESCRIPTION OF THE DRAWINGS

The above and other aspects and features of the present disclosure will become more apparent by describing exemplary embodiments thereof in detail with reference to the attached drawings, in which.

DETAILED DESCRIPTION

Figure 1:
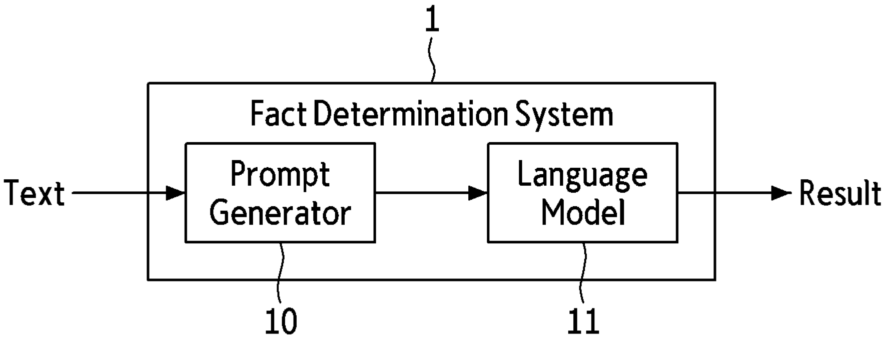
FIG. 1 is a diagram illustrating the configuration of an overall system in which a fact determination method according to an embodiment of the present disclosure may be performed.

Hereinafter, preferred embodiments of the present disclosure will be described with reference to the attached drawings. Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims.

In adding reference numerals to the components of each drawing, it should be noted that the same reference numerals are assigned to the same components as much as possible even though they are shown in different drawings. In addition, in describing the present disclosure, when it is determined that the detailed description of the related well-known configuration or function may obscure the gist of the present disclosure, the detailed description thereof will be omitted.

Unless otherwise defined, all terms used in the present specification (including technical and scientific terms) may be used in a sense that can be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the disclosure. In this specification, the singular also includes the plural unless specifically stated otherwise in the phrase.

In addition, in describing the component of this disclosure, terms, such as first, second, A, B, (a), (b), can be used. These terms are only for distinguishing the components from other components, and the nature or order of the components is not limited by the terms. If a component is described as being “connected,” “coupled” or “contacted” to another component, that component may be directly connected to or contacted with that other component, but it should be understood that another component also may be “connected,” “coupled” or “contacted” between each component.

Hereinafter, embodiments of the present disclosure will be described with reference to the attached drawings.

FIG. 1 is a diagram illustrating the configuration of an overall system in which a fact determination method according to an embodiment of the present disclosure may be performed.

Referring to FIG. 1, a fact determination system 1 in which a fact determination method according to an embodiment of the present disclosure may be performed may include a prompt generator 10 and a language model 20. In some embodiments, the fact determination system 1 may function to receive target text and provide a result of determining whether the target text is factual. Here, the target text may refer to text, content, or information that is subject to fact determination.

The prompt generator 10 is a computing device or system having a function of generating prompts to support the fact determination capability of the language model 20. In some embodiments, the prompt generator 10 may include a lightweight prompt generation model trained to generate prompts optimized for the language model 20. In other words, the prompt generation model may be specialized and trained for a specific language model, i.e., the language model 20, and may therefore generate prompts suitable for the language model 20 without additional prompt optimization processes, thereby maximizing cost-efficiency. Furthermore, miniaturization and lightweight implementation may provide high efficiency and cost-effectiveness in terms of memory usage. Meanwhile, the functions or operations performed by the prompt generator 10 to be described below may be performed by the prompt generation model. In some cases, the prompt generator 10 may also be referred to as a prompt generation model or a prompt generator.

In some embodiments, the prompt generator 10 may perform a function of generating one or more question prompts for inducing extraction of information associated with the target text. In some embodiments, the prompt generator 10 may perform a function of generating a fact determination prompt for determining whether the target text is factual. To this end, the prompt generator 10, i.e., the prompt generation model, may be trained through multitask learning to generate question prompts and fact determination prompts suitable for the language model 20. The training of the prompt generation model will be described later with reference to FIGS. 4 through 8.

The language model 20 may refer to a large language model (LLM), which is artificial intelligence (AI)-based and capable of performing operations such as analyzing and/or generating text by learning various types of text. The language model 20 may generate one or more answers to a specific question. In one example, the language model 20 may generate an answer to a question prompt provided by the prompt generator 10. In another example, the language model 20 may generate an answer to a fact determination prompt provided by the prompt generator 10. In the following description, unless otherwise specified, the language model 20 is assumed to refer to an LLM. The language model 20 may also be referred to as a generative AI model, a question-answering model, or a conversational model.

An inference operation for determining whether target text is factual using the prompt generator 10 and the language model 20 will hereinafter be described in detail with reference to FIGS. 2 and 3.

Figure 2:
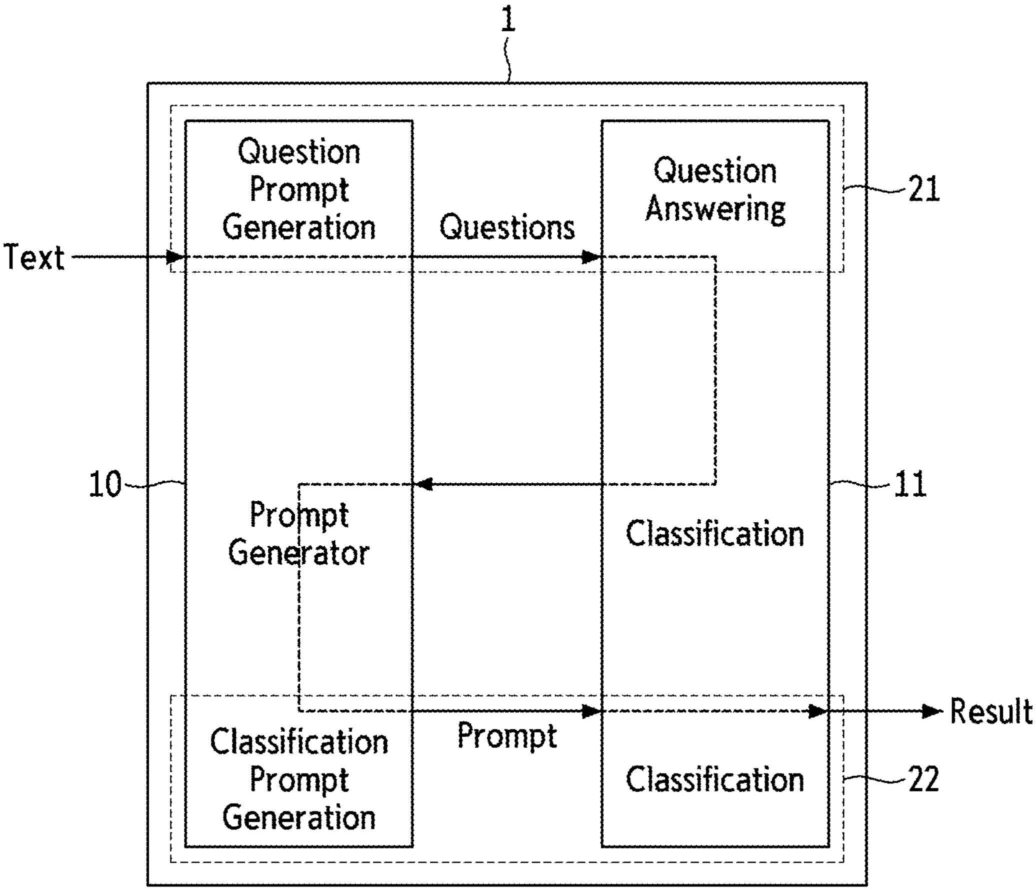
FIG. 2 is a diagram for explaining a fact determination operation according to an embodiment of the present disclosure.

FIG. 2 is a diagram for explaining a fact determination operation according to an embodiment of the present disclosure.

Referring to FIG. 2, information associated with input target text may be extracted through a question-answering operation 21, in which a language model 11 generates an answer to a question prompt generated by the prompt generator 10. The question-answering operation 21 may be performed repeatedly, and then, a fact determination operation 22, in which the language model 11 generates a result of determining whether the target text is factual in response to a fact determination prompt generated by the prompt generator 10, may be performed. Since fact determination refers to a task of classifying whether or not the target text is factual, the fact determination prompt may be referred to as a classification prompt. The question-answering operation 21 will now be described in detail with reference to FIG. 3.

Figure 3:
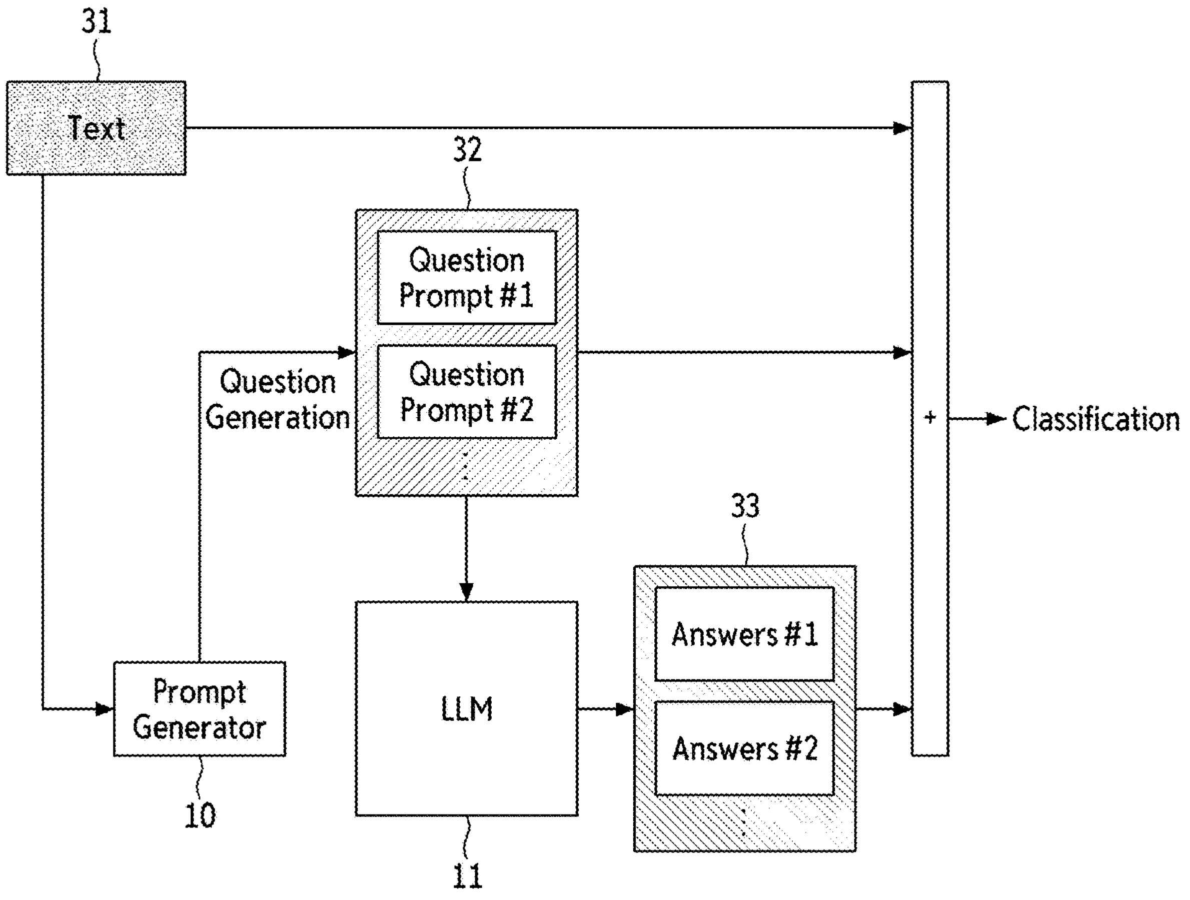
FIG. 3 is a diagram for explaining part of the operation depicted in FIG. 2.

FIG. 3 is a diagram for explaining part of the operation depicted in FIG. 2.

Referring to FIG. 3, target text 31 may be input to the prompt generator 10, and the prompt generator 10 may generate one or more question prompts 32 for inducing the extraction of information associated with the target text 31. The language model 11 may generate answers 33 to the question prompts 32 generated by the prompt generator 10. By repeatedly performing an operation in which the language model 11 generates an answer to each question prompt, information or knowledge regarding the target text 31 may be extracted. Then, since a fact determination task is performed based on the question prompts 32 and the answers 33 to the question prompts 32, an accurate fact determination result may be provided.

Meanwhile, the fact determination system 1 and the prompt generator 10 may be implemented by at least one computing device. For example, all functions of the fact determination system 1 may be implemented on a single computing device, or first and second functions of the fact determination system 1 may be implemented on first and second computing devices, respectively. Alternatively, a specific function of the fact determination system 1 may be implemented on multiple computing devices.

Figure 16:
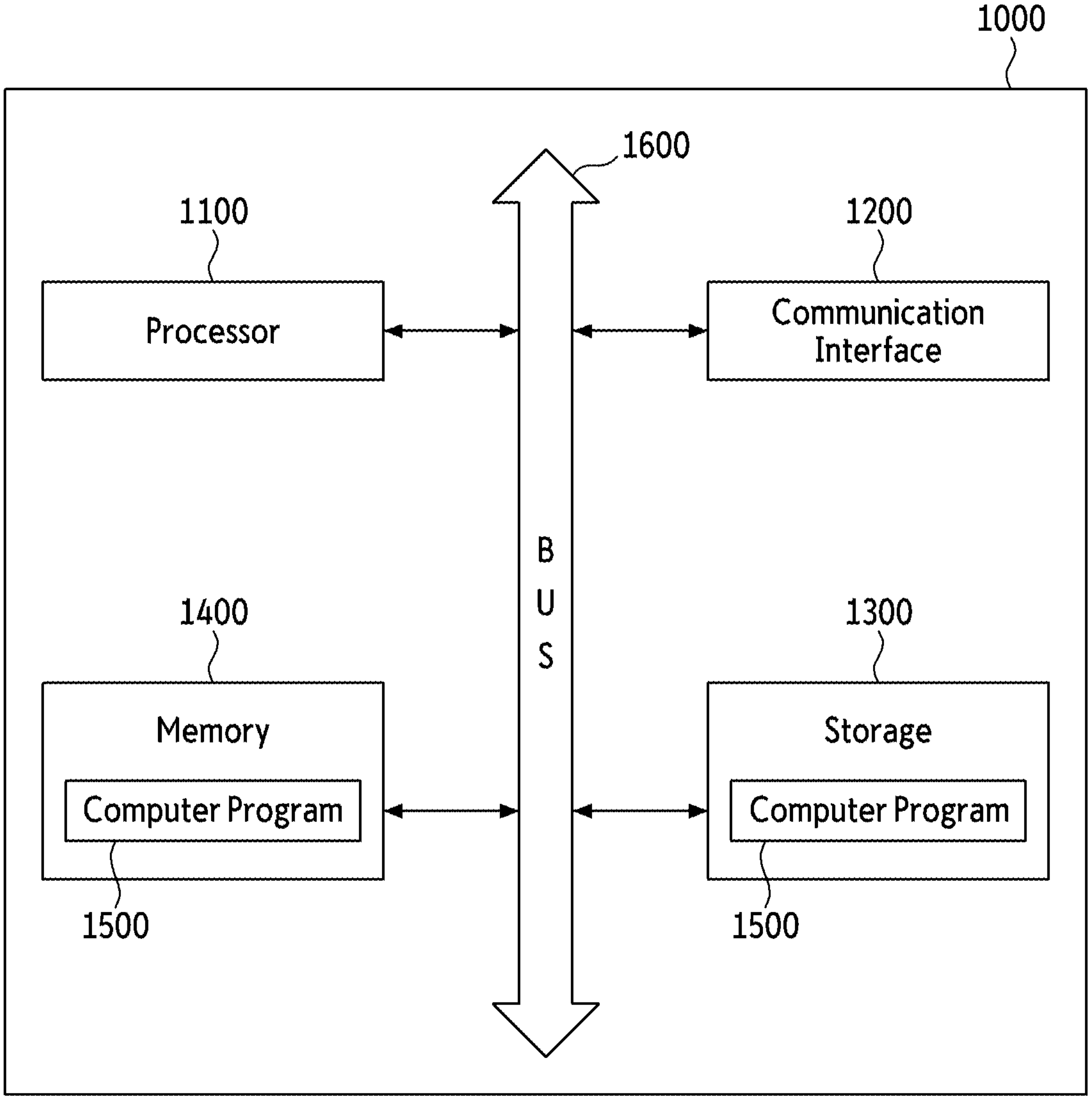
FIG. 16 is a diagram illustrating the hardware configuration of a computing device according to some embodiments of the present disclosure.

Here, the term "computing device" may include any device having a computing function, and an example of such a computing device is as illustrated in FIG. 16. Since a computing device is an aggregate in which various components (e.g., memory, processor, etc.) interact with each other, it may be referred to as a "computing system." Also, a computing system may refer to an aggregate in which multiple computing devices interact with each other.

Thus far, the overall system according to some embodiments of the present disclosure has been described with reference to FIG. 1, and the fact determination operation according to some embodiments of the present disclosure has been described with reference to FIGS. 2 and 3. As described above, according to the present disclosure, when target text is input, a prompt generation model may generate appropriate questions (i.e., question prompts) for inducing relevant knowledge from a language model. Through a question-answering operation with the language model, information associated with the target text may be extracted prior to performing fact determination on the target text. In addition, the prompt generation model may generate a fact determination prompt specialized for the language model, thereby providing an accurate fact determination result. The aforementioned embodiments can be understood in further detail by referring to other embodiments to be described below. In addition, the technical ideas understood from the above embodiments may also be reflected in other embodiments to be described below, even if not expressly described.

Meanwhile, the fact determination system 1 may be applied in and utilized across various fields. For example, the fact determination system 1 may be utilized to detect hallucinations of a language model. That is, the fact determination system 1 may be used to verify whether information provided by a language model is factual and to detect incorrect information, thereby improving the accuracy and reliability of the output of the language model.

A training method for a prompt generation model for generating prompts specialized for a language model will hereinafter be described with reference to FIGS. 4 through 8.

FIGS. 4 through 8 are diagrams for explaining training methods for prompt generation according to some embodiments of the present disclosure. Training for prompt generation to be described below may be implemented in the fact determination system 1. In addition, since the training methods to be described below are for optimizing a prompt generation model for a specific language model, the specific language model may be referred to as a "target language model."

First, a training method for question prompt generation according to some embodiments of the present disclosure will now be described with reference to FIGS. 4 through 6.

The training method for question prompt generation according to some embodiments of the present disclosure may include a primary training phase in which a prompt generation model is initially trained with a small dataset, and an additional training phase in which the prompt generation model trained in the primary training phase is further trained using a larger dataset. Since question prompts are intended to retrieve knowledge related to target text from a target language model, they need to be in a form that enables the target language model to generate accurate answers. That is, the primary and additional training phases aim to generate question prompts in a form that can induce such accurate answers.

Figure 4:
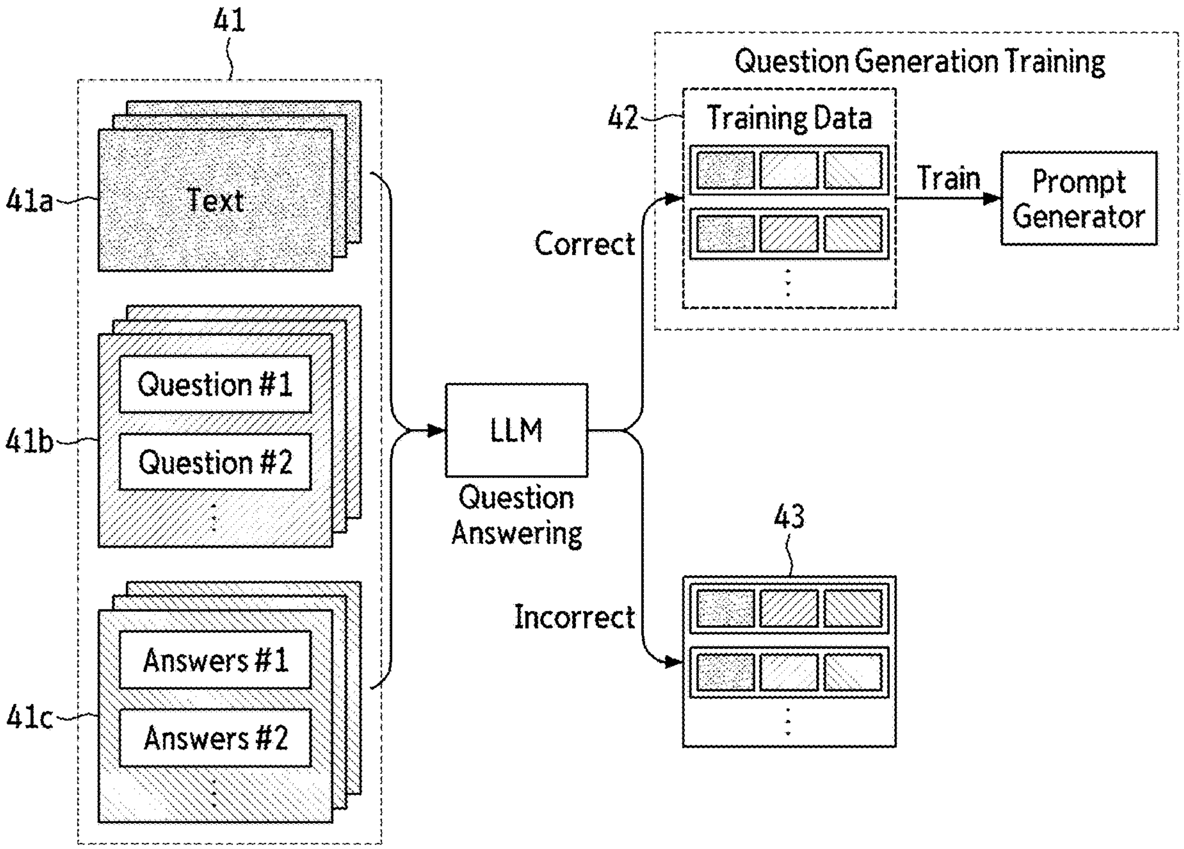
FIGS. 4 through 8 are diagrams for explaining a training method for prompt generation according to some embodiments of the present disclosure.

FIG. 4 is a diagram for explaining the primary training phase.

Referring to FIG. 4, a small dataset 41 for the primary training phase may be obtained. Here, the small dataset 41 (i.e., a plurality of first training data pairs) may include texts 41*a*, questions 41*b* associated with the texts 41*a*, and answers 41*c* to the questions 41*b*. Such a small dataset may use public question-answering (QA) data (e.g., SQuAD).

Then, by filtering the first training data pairs 41, training data pairs in a form that allows the target language model to generate accurate answers may be selected. Here, filtering may refer to filtering out (or removing) some of the first training data pairs 41, and filtered training data pairs may refer to a dataset consisting only of training data pairs that have not been filtered out from among the original (unfiltered) first training data pairs 41.

Specifically, answers to the respective questions 41*b* may be obtained by inputting the texts 41*a* and the questions 41*b* into the target language model. Then, the obtained answers may be compared with correct answers 41*c*, and training data pairs 43 that do not match the correct answers 41*c* may be removed from among the first training data pairs 41, thereby filtering out some of the first training data pairs 41. The remaining first training data pairs 41, i.e., non-filtered-out training data pairs 42, may be used in the primary training phase for the prompt generation model. In other words, questions for which the target language model fails to generate correct answers may be determined to be inappropriate for the target language model, and only questions that elicit answers matching correct answers may be selected and used for training the prompt generation model.

Figure 5:
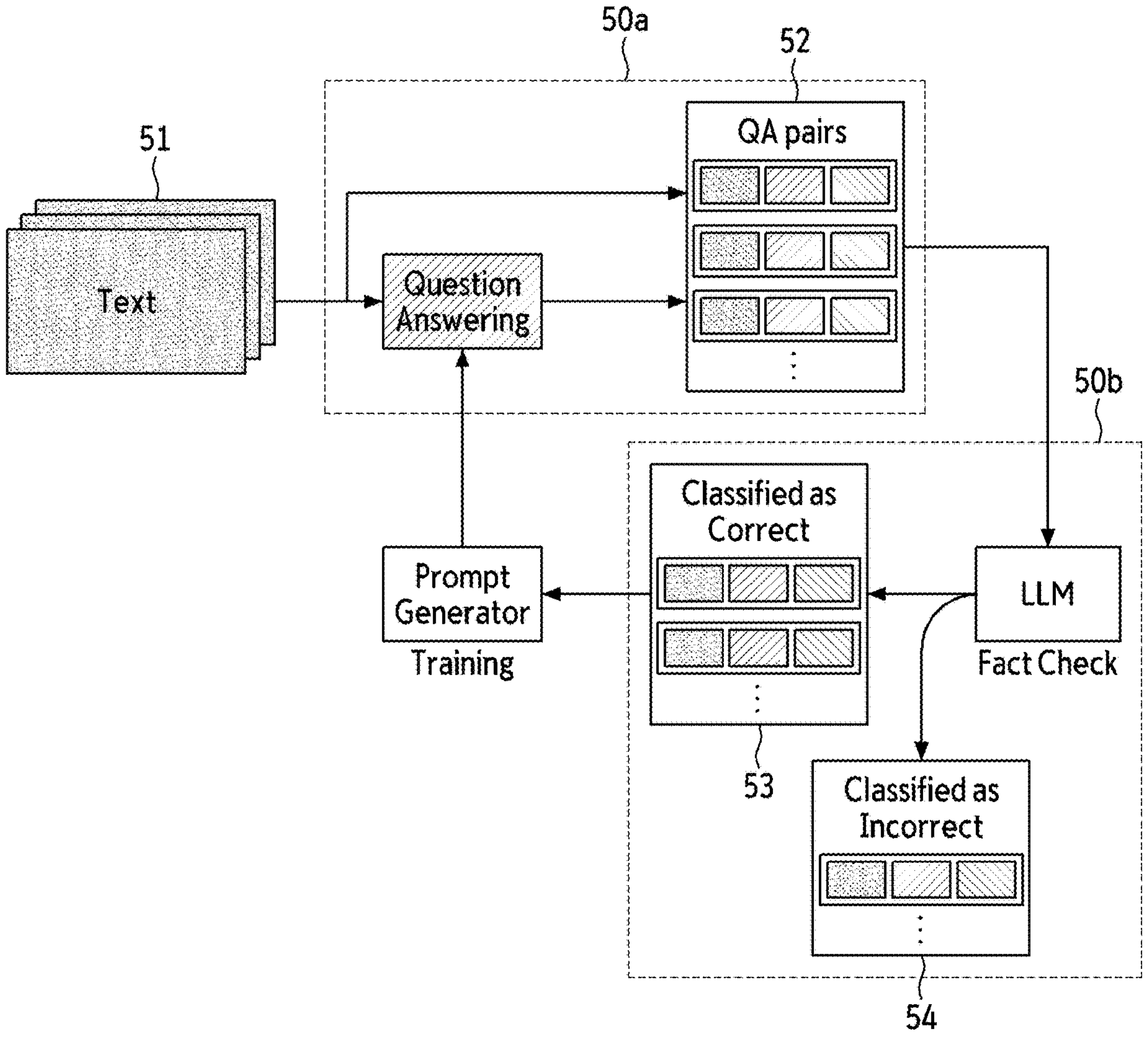
Figure 6:
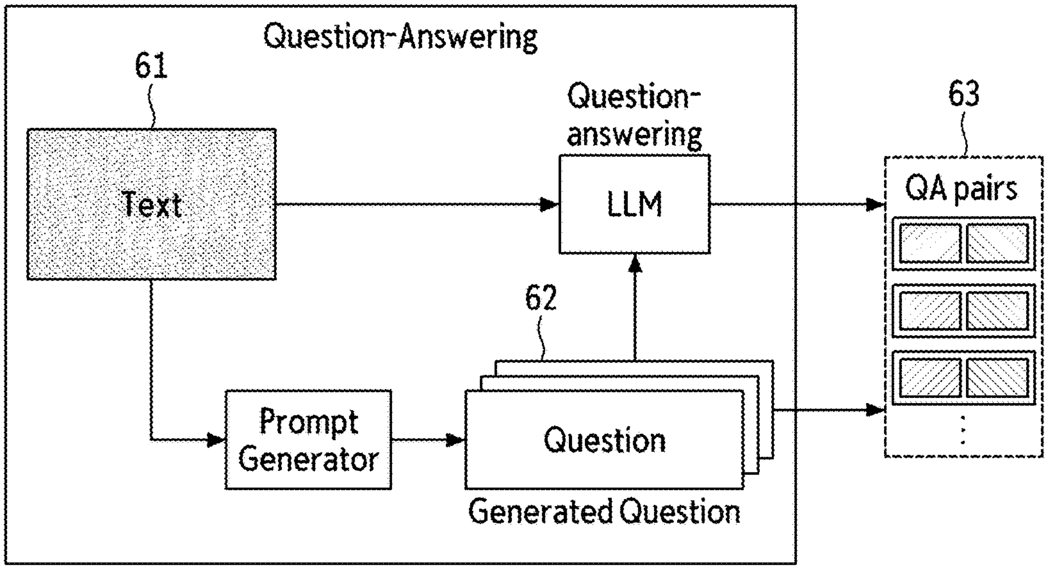

FIGS. 5 and 6 are diagrams for explaining the additional training phase.

Referring first to FIG. 5, a plurality of second training data pairs 52 may be obtained through a question-answering operation 50*a* between the prompt generation model, which has been trained using a plurality of first training texts 51, and the target language model. The plurality of first training texts 51 may be obtained by crawling online encyclopedia documents (e.g., Wikipedia) or publicly available knowledge documents.

Specifically, referring to FIG. 6, one or more question prompts 62 may be generated for a plurality of first training texts 61 using the primarily trained prompt generation model, and the first training texts 61 and the corresponding question prompts 62 may be input into the target language model, thereby obtaining answers to the question prompts 62. In this manner, question prompt-answer pair data 63, i.e., the second training data pairs 52 in FIG. 5, may be obtained.

Thereafter, a filtering operation 50*b* may be performed on some of the second training data pairs 52. Specifically, a fact determination request for the second training data pairs 52 may be sent to the target language model, and training data pairs 54 determined by the target language model to be nonfactual in response to the fact determination request may be removed from among the second training data pairs 52, thereby filtering out some of the second training data pairs 52. The remaining second training data pairs 52, i.e., unfiltered training data pairs 53, may be used in the additional training phase for the prompt generation model, and the prompt generation model may be continuously updated by repeating this process.

During the training process for question prompt generation, the prompt generation model may learn from data filtered through interaction with the target language model, and through this process, question prompts specialized for the target language model may be generated.

A training method for fact determination prompt generation will hereinafter be described in detail with reference to FIGS. 7 and 8.

Figure 7:
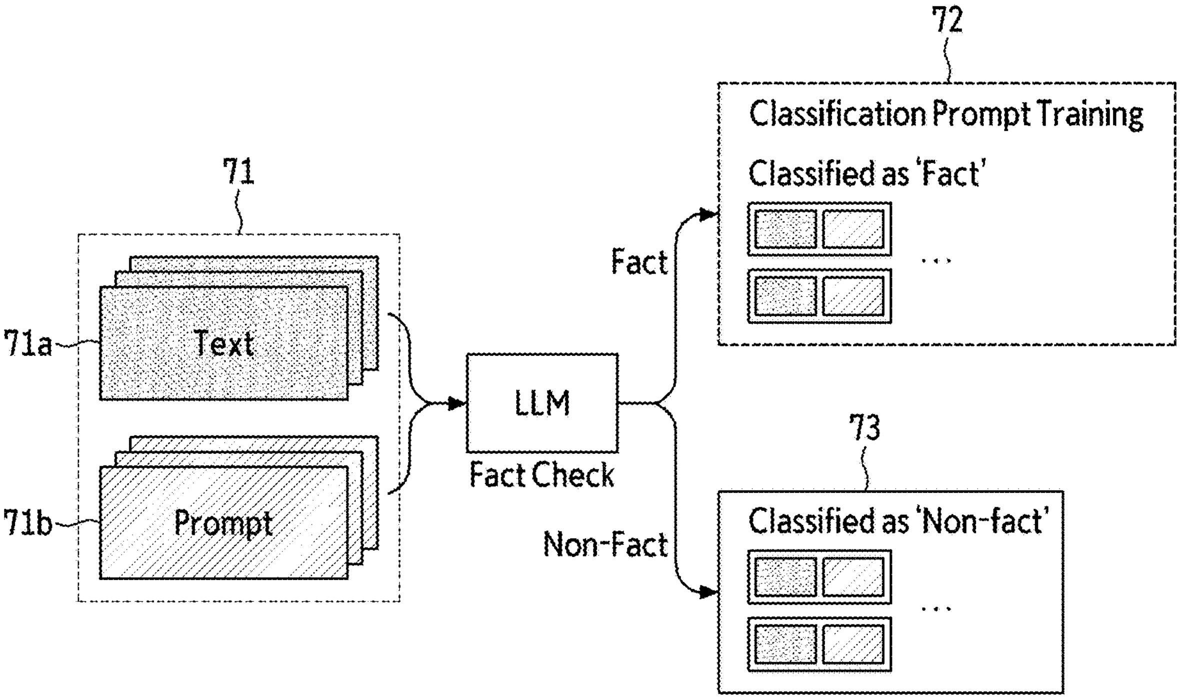

Referring to FIG. 7, a plurality of text-prompt pair data 71, including a plurality of texts 71*a* and corresponding fact determination prompts 71*b*, may be generated.

Figure 8:
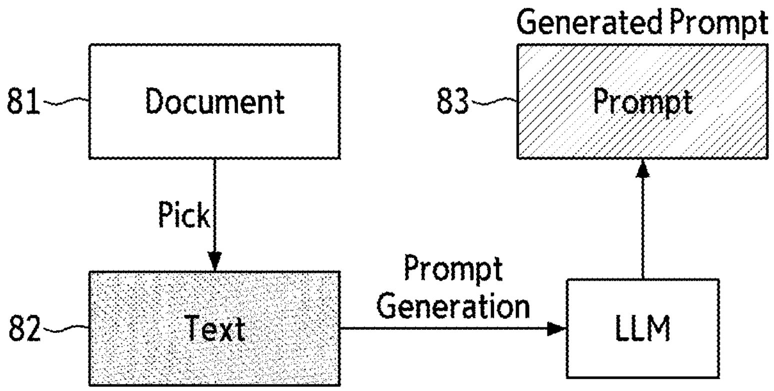

Specifically, referring to FIG. 8, a training document 81 may be obtained, and training texts 82 may be generated by dividing the training document 81 into sentence units. Then, a fact determination prompt request for each training text 82 may be sent to the language model, and a fact determination prompt 83 corresponding to each training text 82 may be generated accordingly. By repeating this process, the text-prompt pair data 71 in FIG. 7 may be generated.

Thereafter, a filtering operation may be performed on the text-prompt pair data 71. Specifically, the text-prompt pair data 71 may be input into the target language model, and a fact determination request for each of the texts 71*a* may be sent to the target language model. Then, text-prompt pair data 71 corresponding to texts 71*a* determined to be non-factual in response to the fact determination request, i.e., text-prompt pair data 73, may be removed from among the text- prompt pair data 72, thereby filtering out some of the text-prompt pair data 71. The remaining text- prompt pair data 71, i.e., unfiltered text-prompt pair data 72, may be used for training the prompt generation model. In other words, fact determination prompts input with texts determined to be nonfactual by the target language model may be considered inappropriate for the target language model. Thus, only fact determination prompts determined to be factual may be selected and used for training the prompt generation model.

During the training process for fact determination prompt generation, the prompt generation model may learn from data filtered through interaction with the target language model, and through this process, fact determination prompts specialized for the target language model may be generated.

Thus far, the training process for the prompt generation model according to some embodiments of the present disclosure has been described in detail with reference to FIGS. 4 through 8. According to the aforementioned embodiments, prompts (e.g., question prompts and fact determination prompts) optimized for the target language model may be generated by performing training using data filtered through interaction with the target language model. In addition, by performing training (i.e., multitask learning) such that a single prompt generation model performs both question prompt generation and fact determination prompt generation, the ability to generate both question prompts and fact determination prompts may be effectively improved.

A prompt generation method according to an embodiment of the present disclosure will hereinafter be described in detail with reference to FIG. 9 and the subsequent drawings. For convenience of understanding, it is to be assumed that all steps/operations of methods to be described below are performed by the fact determination system 1 (or simply "the system 1"). Therefore, when the subject performing a specific step/operation is omitted, it may be understood that the specific step/operation is performed by the fact determination system 1. However, in practice, depending on the implementation, some of the steps of the methods to be described below may be performed by another computing device.

Figure 9:
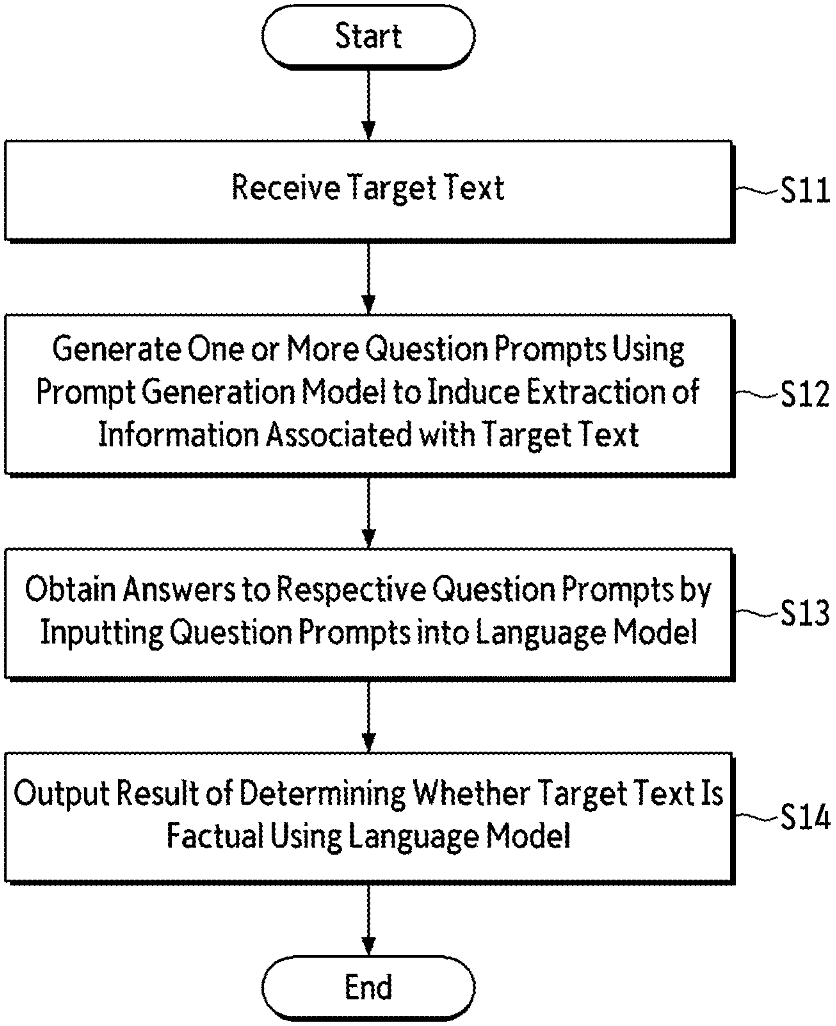
FIG. 9 is a flowchart illustrating a fact determination method according to an embodiment of the present disclosure.

FIG. 9 is a flowchart illustrating a fact determination method according to an embodiment of the present disclosure. However, this embodiment is merely exemplary for achieving the objectives of the present disclosure, and certain steps may be added or omitted as needed.

Referring to FIG. 9, in step S11, target text may be received. Here, the target text may refer to text, content, or information that is subject to fact determination.

Thereafter, in step S12, one or more question prompts may be generated by a prompt generation model to induce extraction of information associated with the target text. To this end, the prompt generation model may be a model trained to generate question prompts optimized for a language model.

The step of training the prompt generation model for question prompt generation will hereinafter be described in detail.

Figure 10:
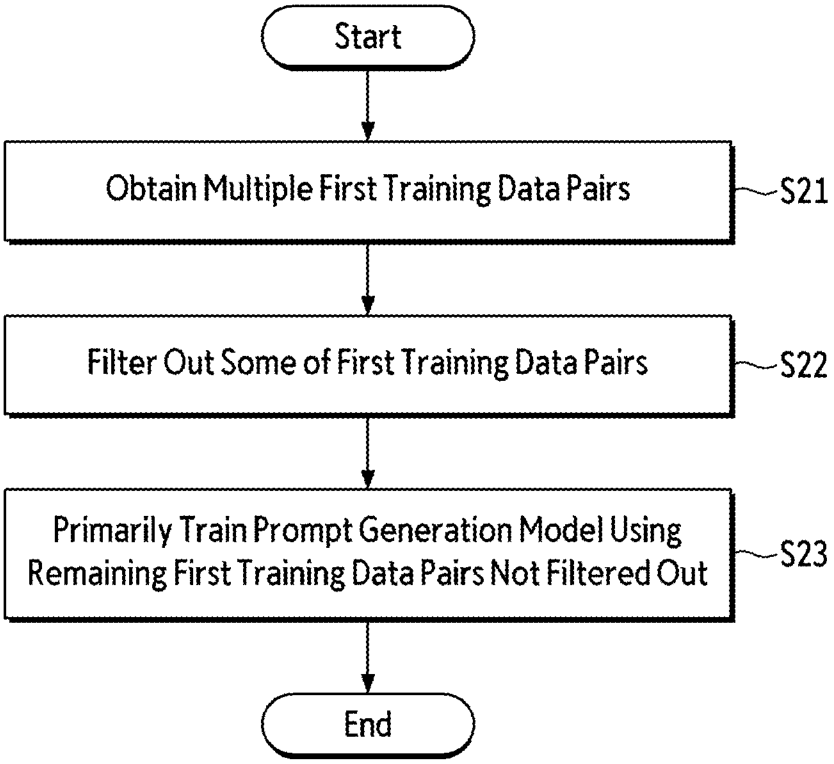
FIG. 10 is a flowchart illustrating a training operation for a prompt generation model for question prompt generation according to some embodiments of the present disclosure.

FIG. 10 is a flowchart illustrating a training operation for a prompt generation model for question prompt generation according to some embodiments of the present disclosure.

Referring to FIG. 10, in step S21, a plurality of first training data pairs may be obtained. Each of the first training data pairs may include text, a plurality of questions associated with the text, and correct answers to the respective questions. Thereafter, in step S22, some of the first training data pairs may be filtered out, and in step S23, the prompt generation model may be primarily trained using the remaining first training data pairs that have not been filtered out. Step S22 will now be described in detail with reference to FIG. 11.

Figure 11:
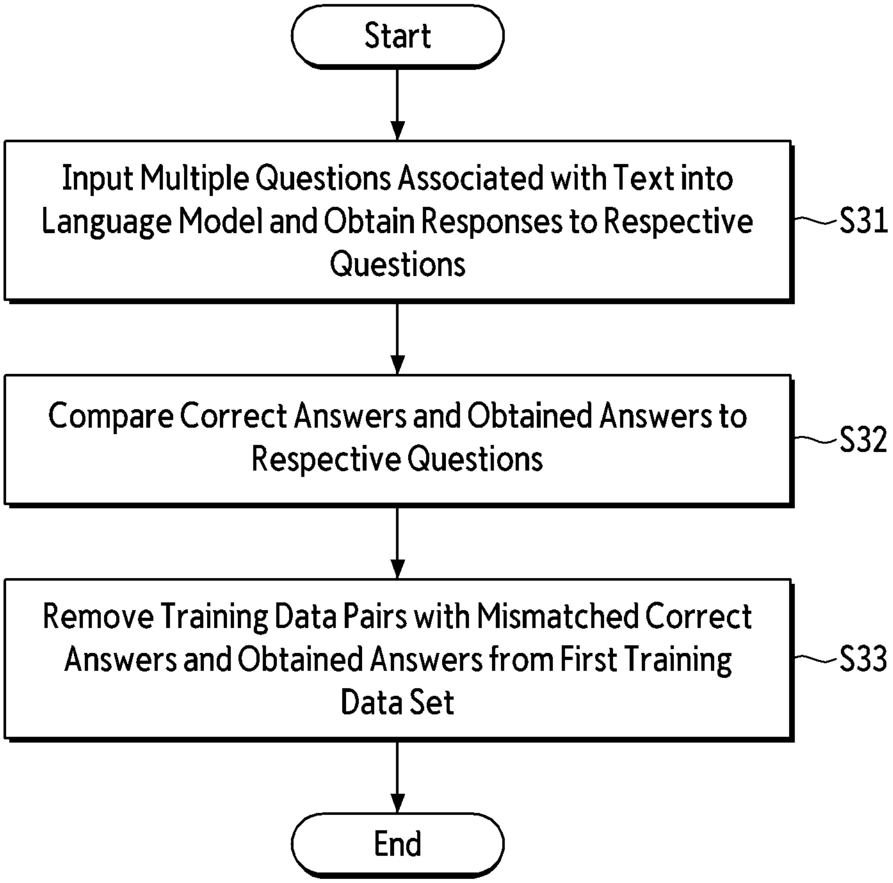
FIG. 11 is a flowchart illustrating part of the operation depicted in FIG. 10.

FIG. 11 is a flowchart illustrating part of the operation depicted in FIG. 10.

Referring to FIG. 11, the step of filtering out a portion of the first training data pairs may include: a step S31 of inputting the text and the questions associated with the text into a language model and obtaining answers to the respective questions; a step S32 of comparing correct answers to the respective questions with the obtained answers; and a step S33 of removing training data pairs in which the correct answers and the obtained answers do not match from among the first training data pairs. For more details, reference can be made to the description in FIG. 4.

Figure 12:
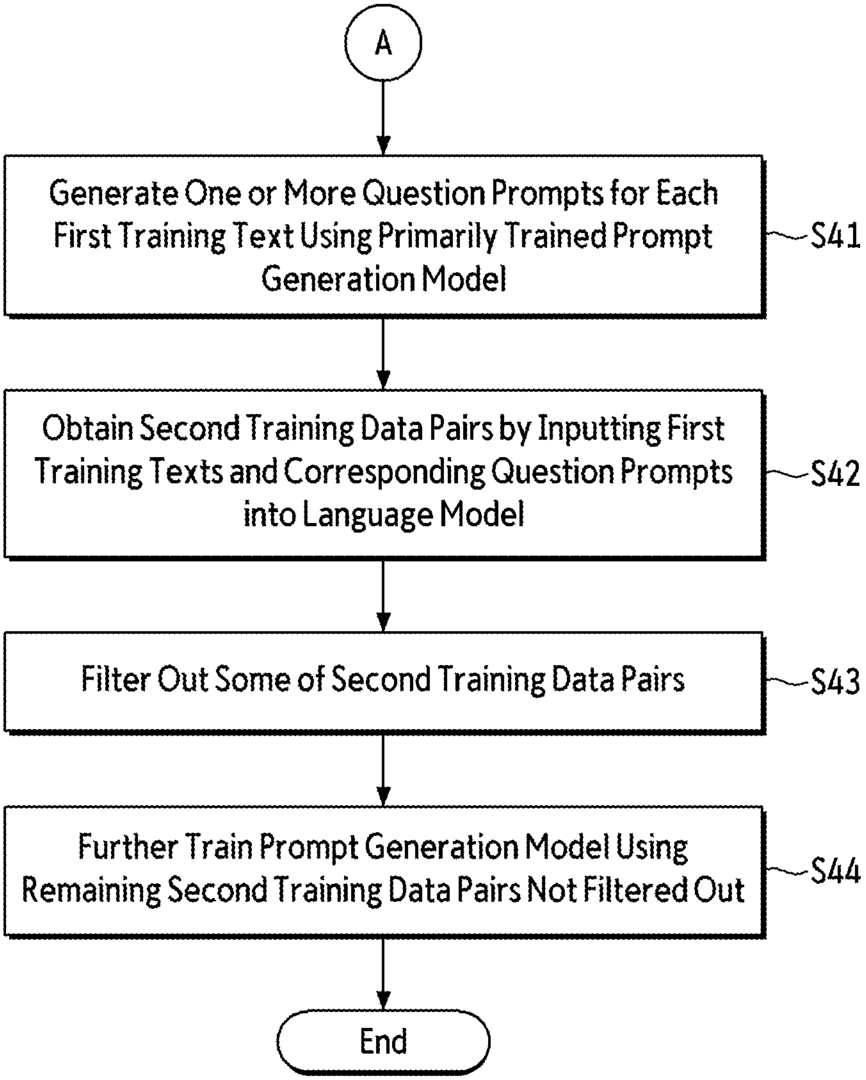
FIG. 12 is a flowchart illustrating steps that may be further performed following the steps depicted in FIG. 10.

FIG. 12 is a flowchart illustrating steps that may additionally be performed following the steps in FIG. 10.

Referring to FIG. 12, after step S23 in FIG. 10, step S41 may be performed in which one or more question prompts are generated for each of a plurality of first training texts using the primarily trained prompt generation model.

Thereafter, in step S42, the first training texts and the corresponding question prompts may be input into the language model, thereby obtaining a plurality of second training data pairs. For more details, reference can be made to the description in FIG. 6.

Thereafter, in step S43, some of the second training data pairs may be filtered out, and in step S44, the prompt generation model may be further trained using the remaining second training data pairs that have not been filtered out.

Step S43 will hereinafter be described in detail with reference to FIG. 13.

Figure 13:
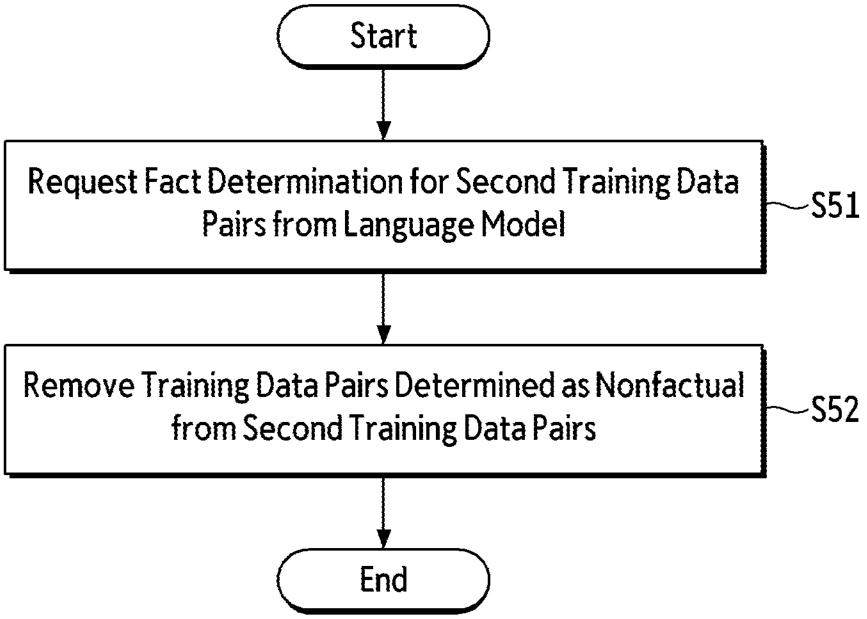
FIG. 13 is a flowchart illustrating part of the operation depicted in FIG. 12.

FIG. 13 is a flowchart illustrating part of the operation depicted in FIG. 12.

Referring to FIG. 13, the step of filtering out some of the second training data pairs may include: a step S51 of sending a fact determination request for the second training data pairs to the language model; and a step S52 of removing training data pairs determined to be nonfactual in response to the fact determination request from among the second training data pairs. For more details, reference can be made to the description in FIGS. 4 and 5.

Referring again to FIG. 9, in step S14, a result of determining whether the target text is factual may be output using the language model. Specifically, a fact determination prompt for determining whether the target text is factual may be generated using the prompt generation model, and the fact determination prompt may be input into the language model, thereby generating a fact determination result for the target text. Here, the prompt generation model may be a model trained to generate fact determination prompts optimized for the language model. A training operation for the prompt generation model for fact determination prompt generation will be described in detail.

Figure 14:
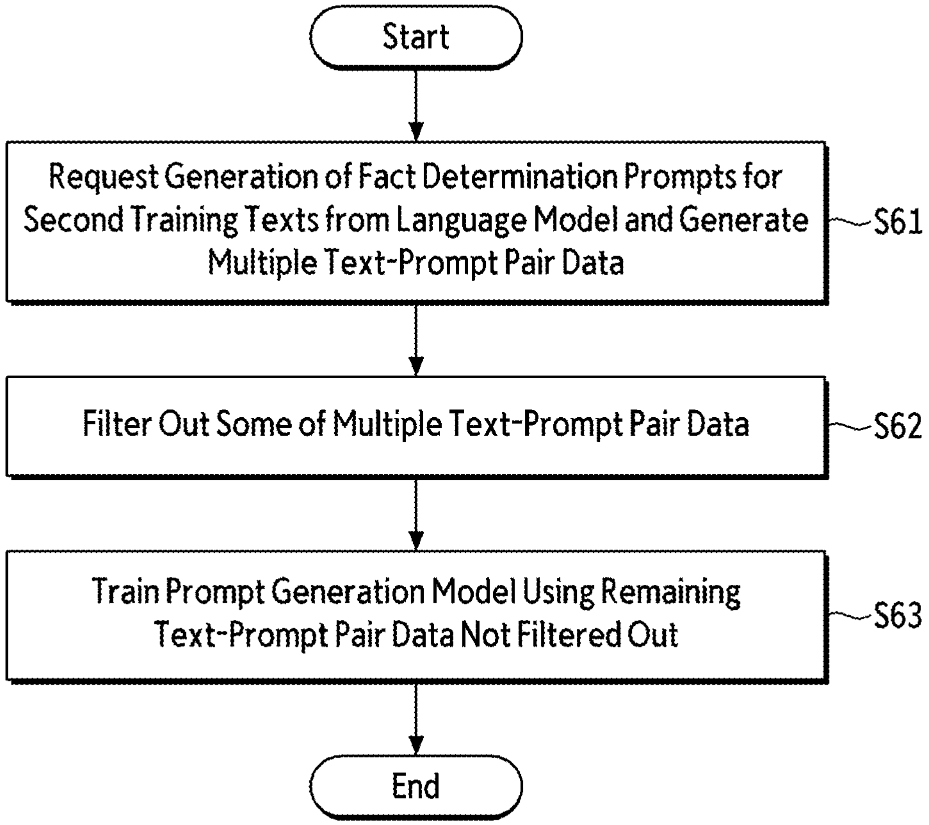
FIG. 14 is a flowchart illustrating a training operation for a prompt generation model for fact determination prompt generation according to some embodiments of the present disclosure.

FIG. 14 is a flowchart illustrating a training operation for a prompt generation model for fact determination prompt generation according to some embodiments of the present disclosure.

Referring to FIG. 14, in step S61, a fact determination prompt generation request for each of a plurality of second training texts may be sent to a language model, thereby generating a plurality of text-prompt pair data. Specifically, a plurality of training documents may be obtained, and the second training texts may be generated by dividing each of the training documents into sentence units. For more details, reference can be made to the description in FIG. 8.

Thereafter, in step S62, some of the plurality of text-prompt pair data may be filtered out, and in step S63, the prompt generation model may be trained using the remaining text-prompt pair data that have not been filtered out. Step S63 will now be described in detail with reference to FIG. 15.

Figure 15:
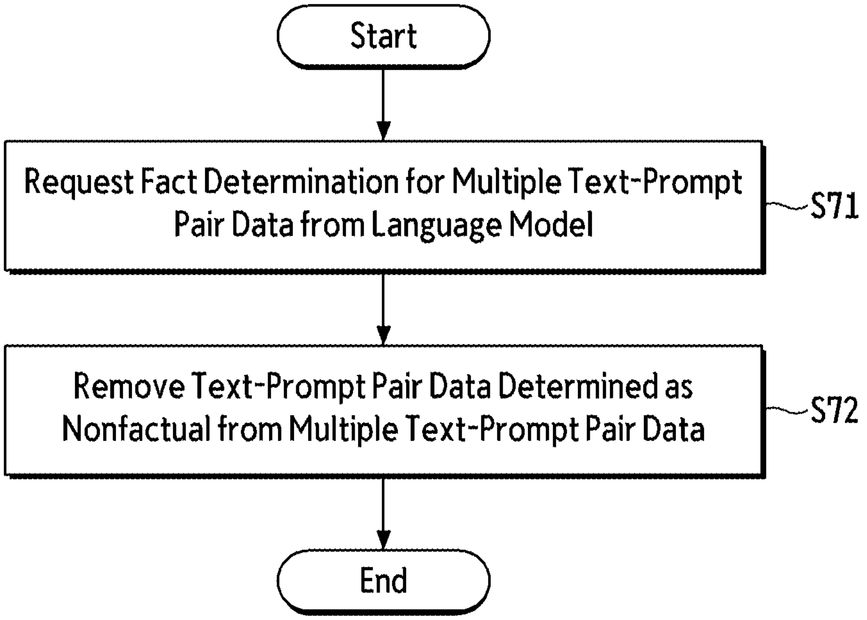
FIG. 15 is a flowchart illustrating some steps depicted in FIG. 14.

FIG. 15 is a flowchart illustrating part of the operation depicted in FIG. 14.

Referring to FIG. 15, the step of filtering out some of the plurality of text-prompt pair data may include: a step S71 of sending a fact determination request for the plurality of text-prompt pair data to the language model; and a step S72 of removing text-prompt pair data determined to be nonfactual in response to the fact determination request from among the plurality of text-prompt pair data. For more details, reference can be made to the description in FIG. 7.

Thus far, with reference to FIGS. 9 through 15, the fact determination method, prompt generation method for supporting fact determination, and training method for such prompt generation according to some embodiments of the present disclosure have been described in detail. According to the aforementioned embodiments, the fact determination performance of a language model may be improved by using question prompts and fact determination prompts generated by a prompt generation model. In particular, by training the prompt generation model to be specialized for the language model, the fact determination performance of the language model may be improved more effectively.

An exemplary computing device 1000 capable of implementing the above-described fact determination system 1 will hereinafter be described with reference to FIG. 16.

FIG. 16 is a hardware configuration diagram of a computing device according to some embodiments of the present disclosure.

Referring to FIG. 16, the computing device 1000 may include at least one processor 1100, a bus 1600, a communication interface 1200, a memory 1400 that loads a computer program 1500 executed by the processor 1100, and a storage 1300 that stores the computer program 1500. FIG. 16 illustrates only the components relevant to the embodiments of the present disclosure. Thus, although not illustrated, other general-purpose components may also be included in the computing device 1000. That is, the computing device 1000 may further include various components in addition to those depicted in FIG. 16. Also, in some embodiments, the computing device 1000 may be configured without some of the components illustrated in FIG. 16. Each component of the computing device 1000 will hereinafter be described.

The processor 1100 may control the overall operation of each component of the computing device 1000. The processor 1100 may include at least one processor such as a central processing unit (CPU), microprocessor unit (MPU), microcontroller unit (MCU), or graphics processing unit (GPU), all of which are well-known in the technical field of the present disclosure. Additionally, the processor 1100 may perform operations for at least one application or program for executing operations/methods according to embodiments of the present disclosure. The computing device 1000 may include one or more processors.

The memory 1400 may store various data, instructions, and/or information. The memory 1400 may load the computer program 1500 from the storage 1300 to execute the operations/methods according to embodiments of the present disclosure. The memory 1400 may be implemented as volatile memory such as random-access memory (RAM), but the present disclosure is not limited thereto.

The bus 1600 may provide a communication function between the components of the computing device 1000. The bus 1600 may be implemented as various types of buses, such as an address bus, data bus, or control bus.

The communication interface 1200 may support wired or wireless Internet communication for the computing device 1000. In addition, the communication interface 1200 may support various types of communication methods beyond internet communication. For this, the communication interface 1200 may include a communication module well known in the technical field of the present disclosure.

The storage 1300 may store one or more computer programs 1500 in a non-transitory manner. The storage 1300 may include a non-volatile memory such as a read-only memory (ROM), erasable programmable ROM (EPROM), electrically erasable programmable ROM (EEPROM), flash memory, a hard disk, a removable disk, or a computer-readable recording medium well known in the technical field of the present disclosure.

The computer program 1500 may include one or more instructions which, when loaded into the memory 1400, cause the processor 1100 to perform various operations/methods according to embodiments of the present disclosure. That is, by executing the loaded instructions, the processor 1100 may perform the operations/methods according to the various embodiments of the present disclosure.

In one example, the computer program 1500 may include instructions for: receiving target text; generating one or more question prompts using a prompt generation model to induce extraction of information associated with the target text; obtaining answers to the respective question prompts by inputting the question prompts into a language model; and outputting a result of determining whether the target text is factual using the language model.

In another example, the computer program 1500 may include instructions for performing at least some of the steps/operations/methods described with reference to FIGS. 1 through 15.

Meanwhile, in some embodiments, the computing device 1000 illustrated in FIG. 16 may refer to a virtual machine implemented based on cloud technology. For example, the computing device 1000 may be a virtual machine operating on one or more physical servers included in a server farm. In this case, at least some of the processor 1100, memory 1400, and storage 1300 depicted in FIG. 16 may correspond to virtual hardware components, and the communication interface 1200 may also be implemented as a virtualized networking component such as a virtual switch.

Thus far, with reference to FIG. 16, an exemplary computing device 1000 capable of implementing the fact determination system 1 has been described.

Various embodiments of the present disclosure and effects according to the embodiments have been mentioned with reference to FIGS. 1 to 16. The effects according to the technical spirits of the present disclosure are not limited to the above-mentioned effects, and other effects not mentioned will be clearly understood by those skilled in the art from the following description.

Furthermore, although a plurality of components have been described as being combined into one or operated in combination in the above embodiments, the technical spirits of the present disclosure are not necessarily limited thereto. That is, all of the components may operate to be selectively combined in one or more within the purpose scope of the technical spirits of the present disclosure.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

Although operations are shown in a specific order in the drawings, it should not be understood that desired results can be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

In concluding the detailed description, those skilled in the art will appreciate that many variations and modifications can be made to the preferred embodiments without substantially departing from the principles of the present disclosure. Therefore, the disclosed preferred embodiments of the disclosure are used in a generic and descriptive sense only and not for purposes of limitation.

What is claimed is:

1. A fact determination method performed by at least one computing device, comprising:

receiving target text;

generating one or more question prompts using a prompt generation model to induce extraction of information associated with the target text;

obtaining answers to respective question prompts by inputting the question prompts into a language model; and outputting a result of determining whether the target text is factual using the language model, wherein the prompt generation model is trained based on: obtaining answers corresponding to a plurality of questions associated with text included in a plurality of first training data pairs, comparing the answers with correct answers obtained with the plurality of questions, and removing training data pairs in which the answers and the correct answers do not match, from among the plurality of first training data pairs.

2. The fact determination method of claim 1, wherein the prompt generation model is a model trained to generate question prompts optimized for the language model, and each of the plurality of first training data pairs includes the text, the plurality of questions, and the correct answers to respective questions, the training of the prompt generation model is further based on primarily training the prompt generation model using remaining first training data pairs that have not been removed.

3. The fact determination method of claim 2, wherein the training of the prompt generation model further comprises: obtaining a plurality of second training data pairs using the primarily trained prompt generation model and the language model; filtering out some of the plurality of second training data pairs; and further training the prompt generation model using remaining second training data pairs that have not been filtered out.

4. The fact determination method of claim 3, wherein the obtaining of the plurality of second training data pairs comprises: generating one or more question prompts for each of a plurality of first training texts using the primarily trained prompt generation model; and obtaining answers to the respective question prompts by inputting the plurality of first training texts and corresponding question prompts into the language model.

5. The fact determination method of claim 3, wherein the filtering out of some of the plurality of second training data pairs comprises: sending a fact determination request for the plurality of second training data pairs to the language model; and removing training data pairs determined to be nonfactual in response to the fact determination request from among the plurality of second training data pairs.

6. The fact determination method of claim 1, wherein the outputting of the result of determining whether the target text is factual comprises: generating a fact determination prompt for determining whether the target text is factual using the prompt generation model; and generating the result of determining whether the target text is factual by inputting the fact determination prompt into the language model.

7. The fact determination method of claim 6, wherein the prompt generation model is a model trained to generate the fact determination prompt optimized for the language model, and the training of the prompt generation model comprises: sending a fact determination prompt generation request for a plurality of second training texts to the language model to generate a plurality of text-prompt pair data;

filtering out some of the plurality of text-prompt pair data;

and training the prompt generation model using remaining text-prompt pair data that have not been filtered out.

8. The fact determination method of claim 7, wherein the generating of the plurality of text-prompt pair data comprises: obtaining a plurality of training documents; and generating the plurality of second training texts by dividing each of the plurality of training documents into sentence units.

9. The fact determination method of claim 7, wherein the filtering out of some of the plurality of text-prompt pair data comprises: sending a fact determination request for the plurality of text-prompt pair data to the language model; and removing text-prompt pair data determined to be nonfactual in response to the fact determination request from among the plurality of text-prompt pair data.

10. A computing device comprising:

at least one processor; and at least one memory storing instructions which, when executed by the at least one processor, cause the at least one processor to perform operations, wherein the operations comprise: receiving target text; generating one or more question prompts using a prompt generation model to induce extraction of information associated with the target text; obtaining answers to respective question prompts by inputting the question prompts into a language model; and outputting a result of determining whether the target text is factual using the language model wherein the prompt generation model is trained based on: obtaining answers corresponding to a plurality of questions associated with text included in a plurality of first training data pairs, comparing the answers with correct answers obtained with the plurality of questions, and removing training data pairs in which the answers and the correct answers do not match, from among the plurality of first training data pairs.

11. The computing device of claim 10, wherein the prompt generation model is a model trained to generate question prompts optimized for the language model, the operations further comprise training the prompt generation model, and each of the plurality of first training data pairs includes the text, the plurality of questions, the training of the prompt generation model is further based on primarily training the prompt generation model using remaining first training data pairs that have not been removed.

12. The computing device of claim 11, wherein the training of the prompt generation model further comprises: obtaining a plurality of second training data pairs using the primarily trained prompt generation model and the language model; filtering out some of the plurality of second training data pairs; and further training the prompt generation model using remaining second training data pairs that have not been filtered out.

13. The computing device of claim 12, wherein the obtaining of the plurality of second training data pairs comprises: generating one or more question prompts for each of a plurality of first training texts using the primarily trained prompt generation model; and obtaining answers to the respective question prompts by inputting the plurality of first training texts and corresponding question prompts into the language model.

14. The computing device of claim 12, wherein the filtering out of some of the plurality of second training data pairs comprises: sending a fact determination request for the plurality of second training data pairs to the language model; and removing training data pairs determined to be nonfactual in response to the fact determination request from among the plurality of second training data pairs.

15. The computing device of claim 10, wherein the outputting of the result of determining whether the target text is factual comprises: generating a fact determination prompt for determining whether the target text is factual using the prompt generation model; and generating the result of determining whether the target text is factual by inputting the fact determination prompt into the language model.

16. The computing device of claim 15, wherein the prompt generation model is a model trained to generate the fact determination prompt optimized for the language model, the operations further comprise training the prompt generation model, and the training of the prompt generation model comprises: sending a fact determination prompt generation request for a plurality of second training texts to the language model to generate a plurality of text-prompt pair data; filtering out some of the plurality of text-prompt pair data; and training the prompt generation model using remaining text-prompt pair data that have not been filtered out.

17. The computing device of claim 16, wherein the generating of the plurality of text-prompt pair data comprises: obtaining a plurality of training documents; and generating the plurality of second training texts by dividing each of the plurality of training documents into sentence units.

18. The computing device of claim 16, wherein the filtering out of some of the plurality of text-prompt pair data comprises: sending a fact determination request for the plurality of text-prompt pair data to the language model; and removing text-prompt pair data determined to be nonfactual in response to the fact determination request from among the plurality of text-prompt pair data.

* * * * *